United States Patent
Chen et al.

(10) Patent No.: US 12,491,965 B2
(45) Date of Patent: Dec. 9, 2025

(54) HUB MOTOR

(71) Applicant: TIEN HSIN INDUSTRIES CO., LTD., Taichung (TW)

(72) Inventors: Chun-Wei Chen, Taichung (TW); Chang-Chun Kao, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 147 days.

(21) Appl. No.: 18/379,186

(22) Filed: Oct. 12, 2023

(65) Prior Publication Data
US 2024/0383568 A1 Nov. 21, 2024

(30) Foreign Application Priority Data
May 19, 2023 (TW) .................. 112118700

(51) Int. Cl.
*B62M 6/65* (2010.01)
(52) U.S. Cl.
CPC .................. *B62M 6/65* (2013.01)
(58) Field of Classification Search
CPC .......... B60K 2007/0038; B60K 7/0007; B60B 27/0015; B60B 27/023; H02K 7/14; H02K 21/24; H02K 2213/12; H02K 5/10; H02K 7/116; H02K 7/1846; H02K 5/04; H02K 5/1732; H02K 5/203; H02K 7/083; B60L 2220/44; B60L 2220/46; B60L 7/10; B62M 6/65
USPC ...................................... 180/65.51
See application file for complete search history.

(56) References Cited

U.S. PATENT DOCUMENTS

| | | | |
|---|---|---|---|
| 9,221,516 B1* | 12/2015 | Song | F16H 9/26 |
| 12,104,974 B2* | 10/2024 | Kang | B62J 45/411 |
| 2021/0094407 A1* | 4/2021 | Payne | B60K 7/0007 |
| 2022/0099508 A1* | 3/2022 | Kang | B62M 6/65 |
| 2023/0182859 A1* | 6/2023 | Huang | H02K 3/26 301/6.5 |
| 2024/0367502 A1* | 11/2024 | Cai | H02K 5/1732 |
| 2024/0383566 A1* | 11/2024 | Chen | B62M 6/65 |

(Continued)

FOREIGN PATENT DOCUMENTS

CN 220122718 U * 12/2023
DE 202019103829 U1 * 12/2019

OTHER PUBLICATIONS

Translation accessed at www.espacenet.com on May 3, 2025. (Year: 2019).*

*Primary Examiner* — James A Shriver, II
*Assistant Examiner* — Hilary L Johns

(57) ABSTRACT

A hub motor includes an axle, a stator, a rotor, a casing, a sleeve, and a torque sensor. The axle is fixed to a frame of the bicycle and has a first end and a second end. The stator is fixed to the axle. The rotor is rotatably sleeved on the axle and rotates around the stator. The casing is rotatably sleeved on the axle and rotates around the rotor and the axle. The casing forms an accommodating space, a first perforation, an opening, and a side cover. The side cover closes the opening and has a second perforation. The accommodating space accommodates the stator and the rotor. The axle is arranged to pass through the casing and the side cover respectively through the first perforation and the second perforation. The sleeve is sleeved at the second end and connected to the side cover. The sleeve has an arrangement part.

6 Claims, 6 Drawing Sheets

(56) References Cited

U.S. PATENT DOCUMENTS

2024/0383567 A1* 11/2024 Chen ...................... H02K 7/116
2024/0388161 A1* 11/2024 Chen ...................... B60B 27/04

* cited by examiner

HUB MOTOR

FIELD OF THE INVENTION

The present disclosure relates to a motor, and more particularly to a hub motor installed on a bicycle.

BACKGROUND OF THE INVENTION

A bicycle is a human-powered vehicle that has a history of more than a century since its development. Recently, in order to assist riders, some bicycles are equipped with hub motors as auxiliary propulsion. A hub motor is a motor that drives the rotation of the casing through an internal mechanism and can be installed on the front or rear wheels of a bicycle to serve as auxiliary power to drive the rotation of the front or rear wheels.

As an auxiliary power, many current hub motors of bicycles are equipped with torque sensors connected to the bicycle's transmission components. The hub motor will start when the torque sensor senses that the input torque from the rider exceeds a certain value. However, due to the complex usage environment, it is a challenge to accurately sense the torque input by the rider.

SUMMARY OF THE INVENTION

The present disclosure provides a hub motor with good sensing performance.

To achieve the above advantages, an embodiment of the present disclosure provides a hub motor suitable for installation on a bicycle. The hub motor includes an axle, a stator, a rotor, a casing, a sleeve, and a torque sensor. The axle is fixed to a frame of the bicycle and has a first end and a second end opposite to the first end. The stator is fixed to the axle and near the first end. The stator includes an electromagnet. The rotor is rotatably sleeved on the axle and suitable for rotating around the stator. The casing is rotatably sleeved on the axle and suitable for rotating around the rotor and the axle. The casing forms an accommodating space, a first perforation, an opening, and a side cover. The side cover is used to close the opening and is provided with a second perforation. The accommodating space accommodates the stator and the rotor. The opening faces the second end. The axle is arranged to pass through the casing and the side cover respectively through the first perforation and the second perforation. The sleeve is sleeved at the second end of the axle and connected to the side cover. The sleeve has an arrangement part. The arrangement part is located on a surface of a side of the sleeve away from the axle. The torque sensor is connected to the sleeve and includes a sensing unit. The sensing unit is arranged in the arrangement part.

In one embodiment, the sensing unit has an interval to an axis of the axle, and the interval is between 8.15 mm and 12.6 mm.

In one embodiment, the aforementioned hub motor further includes an outer cylinder, sleeved on the sleeve and covering the arrangement part and the torque sensor.

In one embodiment, the sleeve and the outer cylinder jointly form an internal ratchet mechanism.

In one embodiment, the outer cylinder is suitable for engaging a variable speed gear set of the bicycle.

In one embodiment, the sensing unit is a strain gauge, and a sensing direction of the strain gauge is set along a circumferential direction of the sleeve.

In one embodiment, the aforementioned hub motor further includes a power supply, a first coil, and a second coil. The power supply is electrically connected to the torque sensor. The first coil is electrically connected to a power supply and fixed on the axle. The second coil is fixed on the sleeve and parallel to the first coil and is suitable for rotation relative to the first coil. The torque sensor is electrically connected to the second coil and electrically connected to the power supply through the first coil and the second coil.

Based on the above description, the hub motor of the present disclosure has good sensing performance by installing the sensing unit of the torque sensor on the surface of the sleeve far from the axle, which can block, by sleeve, water or dirt entering the gap between the axle and the sleeve and therefore preventing the sensing unit of the torque sensor from being affected.

Other objectives, features, and advantages of the invention will be further understood from the further technological features disclosed by the embodiments of the present disclosure wherein there are shown and described preferred embodiments of this invention, simply by way of illustration of modes best suited to carry out the invention.

DETAILED DESCRIPTION OF PREFERRED EMBODIMENTS

Figure 1A:
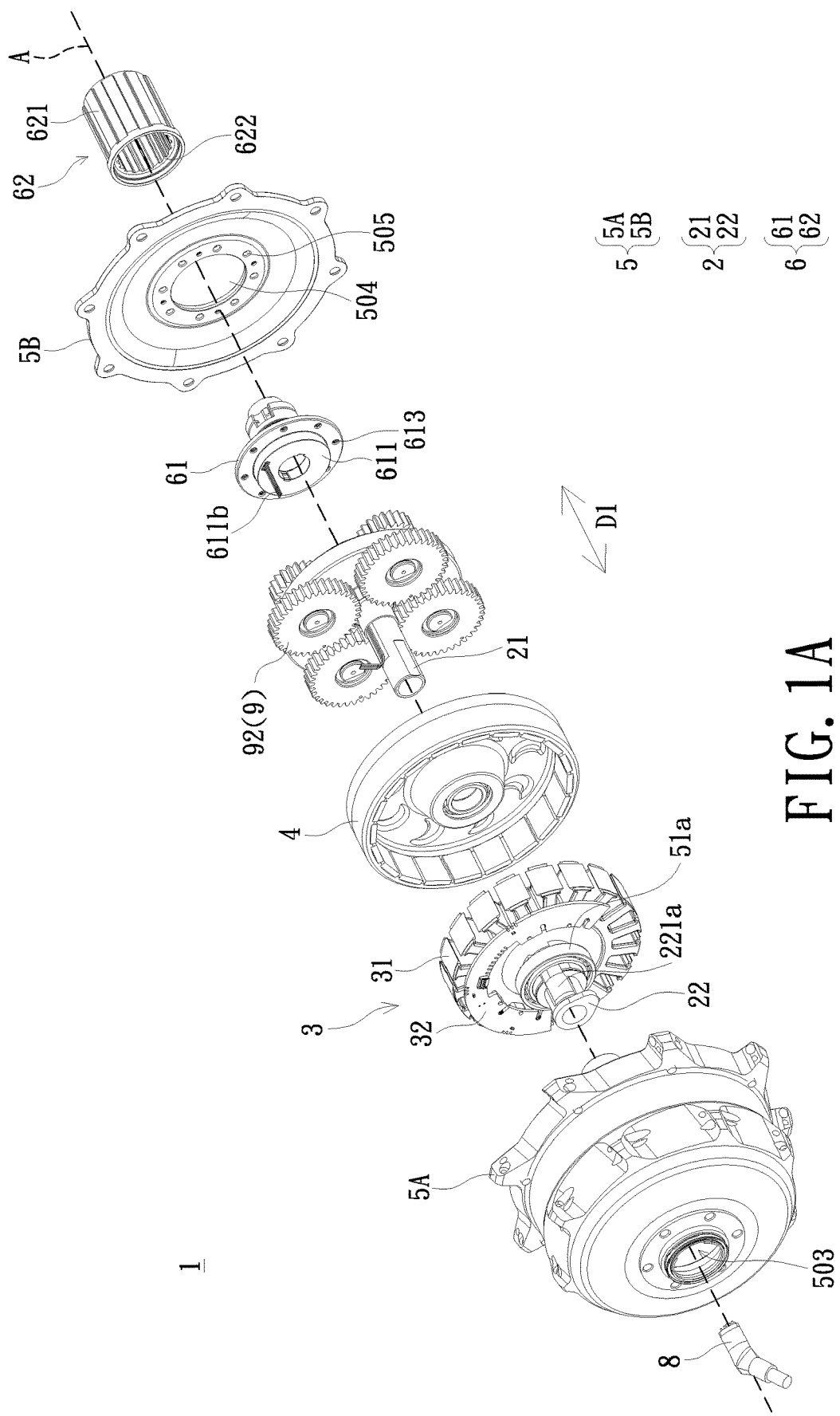
FIG. 1A is a schematic exploded view of a hub motor according to an embodiment of the present disclosure.

Terms used in the description of the embodiments of the present disclosure, for example, orientation or position relation such as "above" and "below" are described according to the orientation or position relation shown in the drawings. The above terms are used for facilitating the description of the present disclosure rather than limiting the present disclosure, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 1B:
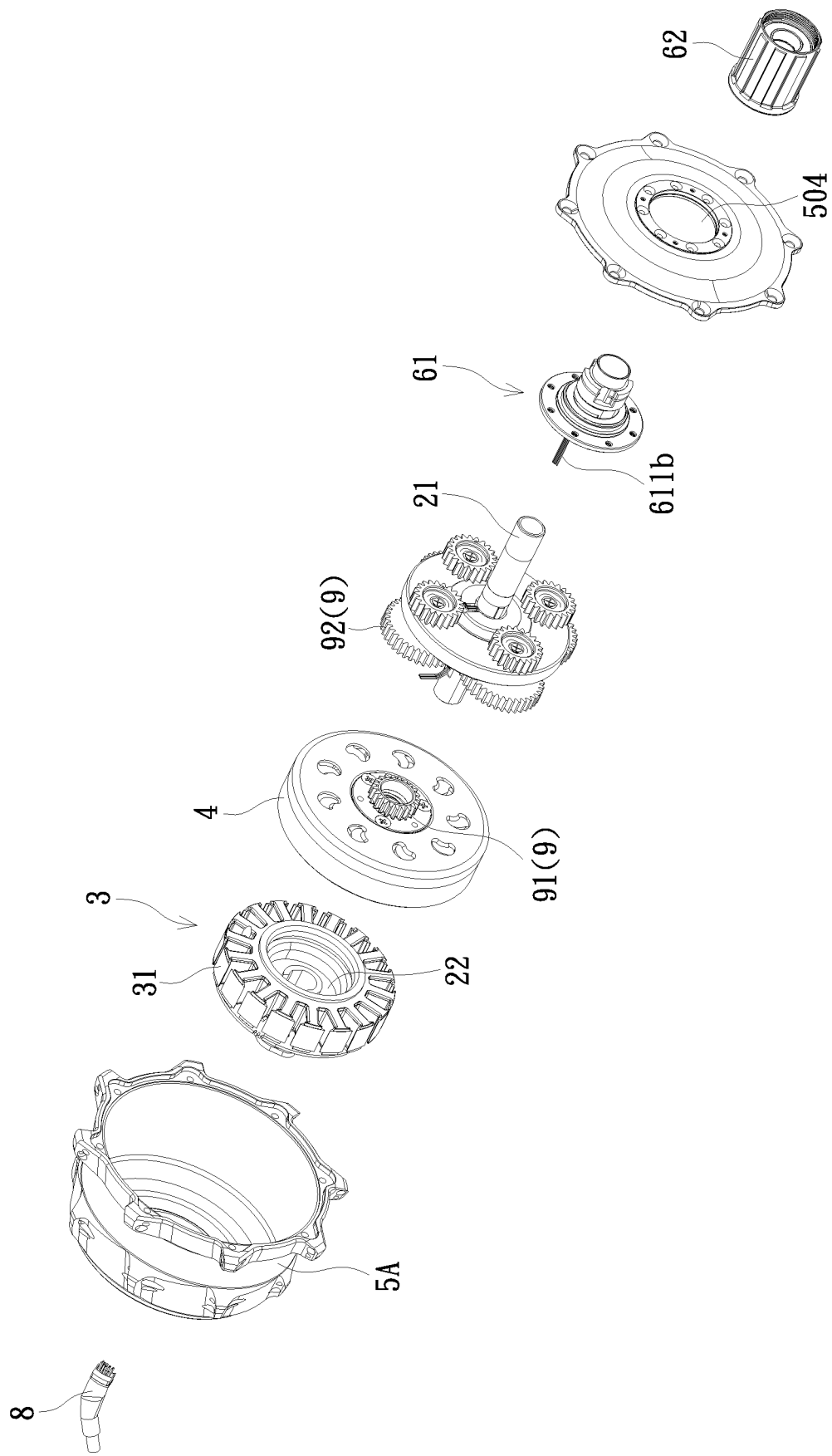
FIG. 1B is a schematic exploded view of the hub motor in FIG. 1A from another viewing angle.
Figure 2:
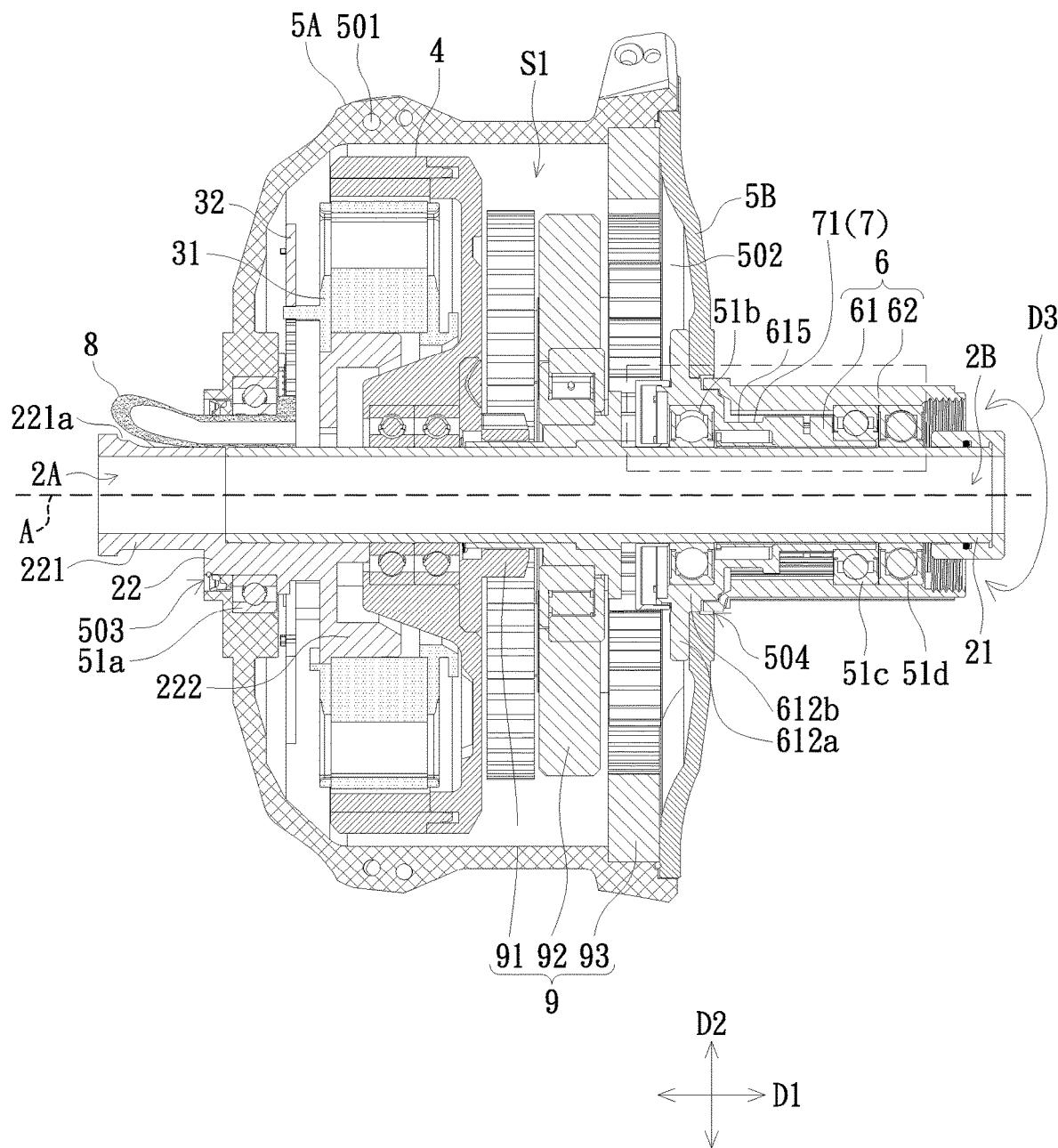
FIG. 2 is a schematic cross-sectional view of the hub motor in FIG. 1A.

FIG. 1A is a schematic exploded view of a hub motor according to an embodiment of the present disclosure. FIG. 1B is a schematic exploded view of the hub motor in FIG. 1A from another viewing angle. FIG. 2 is a schematic cross-sectional view of the hub motor in FIG. 1A. As shown in FIG. 1A to FIG. 2, the hub motor 1 of this embodiment is suitable for installation on a bicycle (not shown) and includes an axle 2, a stator 3, a rotor 4, a casing 5, a sleeve 61, and a torque sensor 7. The axle 2 is fixed to the frame (not shown in the figure) of the bicycle and has a first end 2A and a second end 2B opposite to the first end 2A in the extension direction D1. The stator 3 is fixed on the axle 2 and is close to the first end 2A. The stator 3 includes an electromagnet component 31. The rotor 4 is rotatably sleeved on the axle 2 and is suitable for rotating around the stator 3. The casing 5 is rotatably sleeved on the axle 2 and is suitable for rotating around the rotor 4 and the axle 2. The casing 5 forms an accommodating space S1, an opening 502, a first perforation 503, and a side cover 5B. The side cover 5B is used to close the opening 502 and is provided with a second perforation 504. The accommodating space S1 accommodates the stator 3 and the rotor 4. The opening 502 faces the second end 2B. The axle 2 is arranged to pass through the casing 5 and the side cover 5B through the first perforation 503 and the second perforation 504, respectively. The sleeve 61 is sleeved at the second end 2B of the axle 2 and connected to the side cover 5B. The sleeve 61 has an arrangement part 615. The arrangement part 615 is located on the surface of the side of the sleeve 61 away from the axle 2. The torque sensor 7 is connected to the sleeve 61. The torque sensor 7 has a sensing unit 71. The sensing unit 71 is arranged in the arrangement part 615. Therefore, the hub motor 1 is activated as an auxiliary power for the bicycle when, for example, the torque sensed by the torque sensor 7 is greater than a preset value.

In this embodiment, the hub motor 1 is installed on the rear wheel (not shown in the figure) of the bicycle, and the axle 2 is fixed on the frame of the bicycle, for example. The casing 5, for example, includes a body 5A and the side cover 5B. The accommodating space S1 is located inside the body 5A. The first perforation 503 and the opening 502 are located on the side of the body 5A near the first end 2A and the side of the body 5A near the second end 2B, respectively. The outer surface of the body 5A has a plurality of through-holes 501. The through-holes 501 are suitable for connecting a plurality of spokes and therefore are indirectly connected to the wheel frame (not shown in the figure) of the rear wheel of the bicycle to drive the rear wheel to rotate when the body 5 rotates. However, the installation position of the hub motor 1 is not limited to the rear wheel.

As shown in FIGS. 1A to 2, in this embodiment, the stator 3 includes, for example, an electromagnet component 31 (a combination of a plurality of electromagnets). The electromagnet component 31 is fixed on the axle 2 and generates a magnetic field through the current provided by the power line 8, thereby causing the rotor 4 including a magnet to rotate relative to the stator 3 and then driving the entire casing 5 to rotate through the rotor 4 and a planetary gear set 9.

The hub motor 1 controls, through the control unit 32, the magnitude of the current entering the electromagnet component 31 through the power line 8 to control the speed of the casing 5 by changing the magnitude of the magnetic field generated by the electromagnet component 31. The position of the control unit 32 is not limited. For example, in this embodiment as shown in FIGS. 1A and 2, the control unit 32 is arranged on one side of the electromagnet component 31. In another embodiment not shown in the figure, the control unit 32 is arranged outside the hub motor 1.

As shown in FIGS. 1A to 2, in this embodiment, the planetary gear set 9 includes, for example, a central gear 91, a transmission component 92, and a ring gear 93. The central gear 91, for example, is connected to the rotor 4 and is suitable for rotating around the axle 2 as the rotor 4 rotates. The transmission component 92 is connected between the central gear 91 and the ring gear 93. The ring gear 93 is tightly clamped to the body 5A, located on one side of the accommodating space S1, and near the opening 502 (and the side cover 5B). Therefore, when the rotor 4 rotates, the casing 5 can be driven to rotate through the planetary gear set 9.

As shown in FIGS. 1A to 2, in this embodiment, the axle 2 includes, for example, a central shaft member 21 and a connecting member 22. The connecting member 22 is close to the first end 2A. The connecting member 22 has a central column 221 (see FIGS. 1A and 2) and a positioning plate 222 (see FIG. 2). The positioning plate 222 is located at one end of the central column 221 near the second end 2B of the axle 2 and is suitable for connecting with the stator 3. The central column 221 is suitable for fixing on the axle 2. The end of the central column 221 far from the positioning plate 222 leaves the body 5A through the first perforation 503 and is connected to the frame of the bicycle during assembly, thereby forming a channel 221a where the power line 8 enters the accommodating space S1 through the first perforation 503. The central column 221 is sleeved with a rolling bearing 51a. The rolling bearing 51a is suitable for contacting the wall surface of the first perforation 503, thereby making the body 5A rotatably sleeved on the central column 221 (axle 2). The detailed structure of the axle 2 is not limited thereto.

As shown in FIGS. 1A to 2, in this embodiment, the hub motor 1 further includes, for example, an outer cylinder 62. The outer cylinder 62 and the sleeve 61 together form the cassette body 6 of the hub motor 1. The outer cylinder 62 is rotatably sleeved on the sleeve 61 and covers the outer diameter surface of the sleeve 61. The outer diameter surface of the outer cylinder 62 is formed with a plurality of ribs 621. The ribs 621 are suitable for engaging the sprockets of the cassette (not shown in the figure) of the bicycle. The inner diameter surface of the outer cylinder 62 is provided with an internal ratchet 622 (see FIG. 1A). The outer cylinder 62 is suitable for forming an internal ratchet mechanism (detailed later) together with the sleeve 61 and the paddle 618 installed between the sleeve 61 and the outer cylinder 62.

Figure 3:
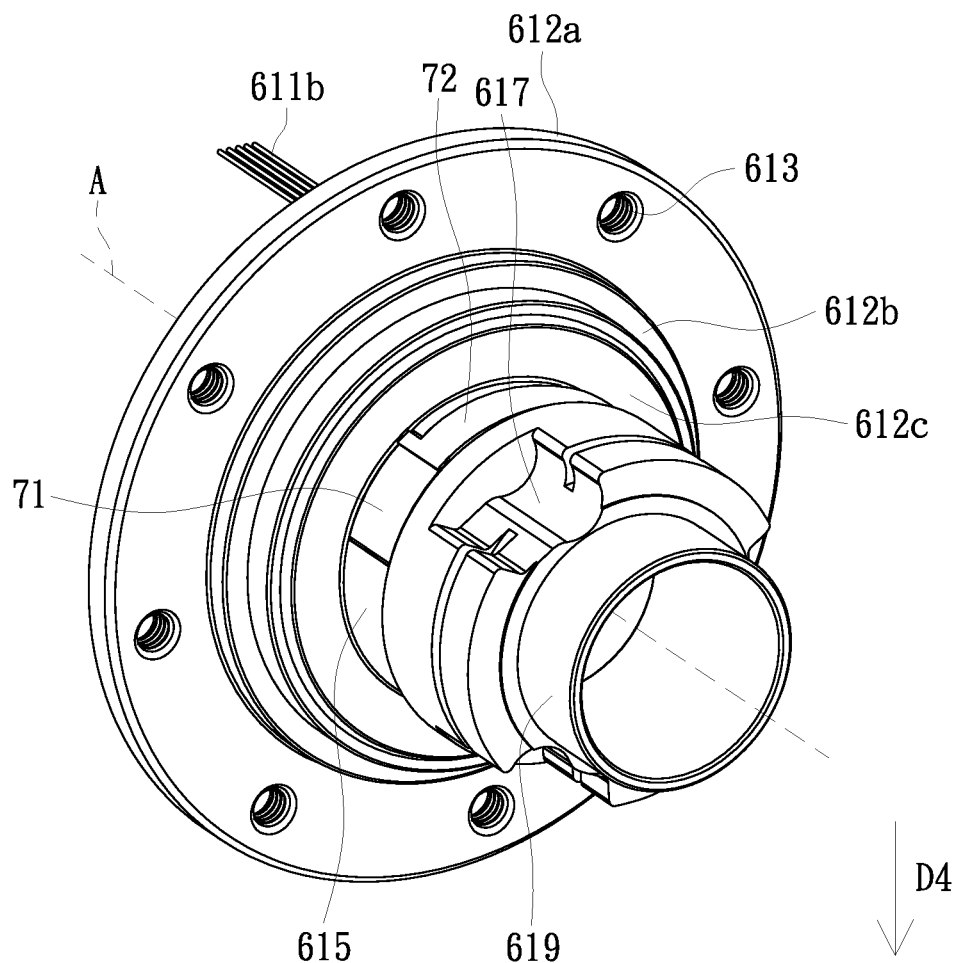
FIG. 3 is a schematic three-dimensional diagram of the sleeve in FIG. 2.
Figure 4:
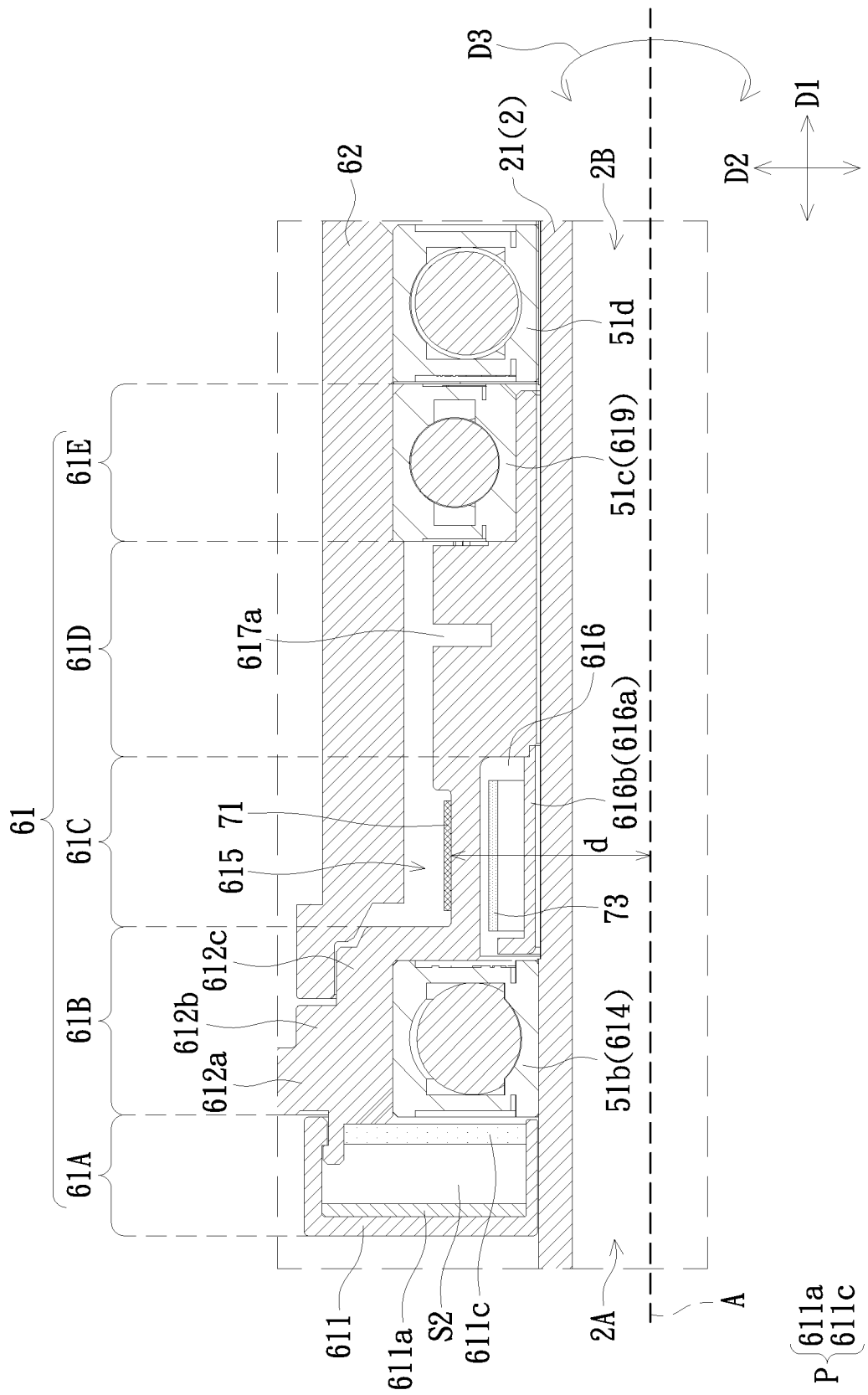
FIG. 4 is a schematic cross-sectional diagram of the installation location of the torque sensor in FIG. 2.

FIG. 3 is a schematic three-dimensional diagram of the sleeve in FIG. 2. FIG. 4 is a schematic cross-sectional diagram of the installation location of the torque sensor in FIG. 2. As shown in FIG. 4, the sleeve 61 includes a first section 61A, a second section 61B, a third section 61C, a fourth section 61D, and a fifth section 61E in sequence in the extension direction D1 from the first end 2A to the second end 2B.

As shown in FIGS. 1A, 3, and 4, the first section 61A of the sleeve 61 is rotatably assembled with a sliding cover 611. The sliding cover 611 is fixed on the axle 2 and can rotate relative to the sleeve 61 along the circumferential direction D3 of the sleeve 61. In other words, the sliding cover 611 does not rotate with the sleeve 61 when the casing 5 rotates. A cavity S2 is formed between the sliding cover 611 and the sleeve 61. A power supply P is arranged in the cavity S2. The power supply P is electrically connected to the torque sensor 7 and is suitable for providing the current required by the torque sensor 7.

Specifically, as shown in FIGS. 3 and 4, in this embodiment, the power supply P includes, for example, a first substrate 611a and a second substrate 611c. The first substrate 611a is fixed on the sliding cover 611 and has a first coil (not shown in the figure) and a power line 611b (see FIG. 3) electrically connected to the first coil. The power line 611b is arranged to pass through the sliding cover 611 and is suitable for connecting to an external power supply (not shown in the figure). The second substrate 611c is fixed on the sleeve 61 and can rotate relative to the first substrate 611a and is spaced with the first substrate 611a. The second substrate 611c has a second coil (not shown in the figure). When the external power supply supplies current, the power supply P can generate induced current through the first coil and the second coil to the torque sensor 7. The above description is only an example, and the specific design of power supply P is not limited by the above description.

As shown in FIGS. 2, 3, and 4, the second section 61B is suitable for connecting to the side cover 5B. The outer diameter surface of the second section 61B of the sleeve 61 is protruded with a first disc body 612a, a second disc body 612b, and a third disc body 612c. Specifically, the first disc body 612a, the second disc body 612b, and the third disc body 612c all extend from the outer diameter surface of the sleeve 61 in the radial direction D2, and the outer diameters of the first disc body 612a, the second disc body 612b, and the third disc body 612c decrease sequentially. The outer diameter of the first disc body 612a is greater than the diameter of the second perforation 504 on the side cover 5B. The outer diameter of the second disc body 612b corresponds to the diameter of the second perforation 504. The outer diameter of the third disc body 612c corresponds to the inner diameter of the side of the outer cylinder 62 near the first end 2A (see FIG. 2).

As shown in FIGS. 2 and 3, the first disk body 612a is provided with a plurality of third perforations 613 extending in the extension direction D1. The side cover 5B is provided with a plurality of fourth perforations 505. The fourth perforations 505 surround the second perforation 504, and the quantity and positions of the fourth perforations 505 correspond to the quantity and positions of the third perforations 613. When assembled, the third perforations 613 and the respective fourth perforations 505 are aligned with each other through a plurality of screws (not shown in the figure), and the sleeve 61 is firmly connected to the side cover 5B. As shown in FIGS. 2 and 4, the first disc body 612a is located in the accommodating space S1 when the sleeve 61 is connected to the side cover 5B. When assembled, the second disc body 612b covers the second perforation 504. The outer cylinder 62 is sleeved on the third disc body 612c. In this embodiment, because the outer cylinder 62 is supported by the rolling bearings 51c and 51d (detailed later), the outer cylinder 62 does not contact the third disc body 612c, but the detailed connection relationship is not limited thereto.

As shown in FIGS. 2 and 4, the sleeve 61 forms a first accommodating groove 614 on the inner diameter surface of the second section 61B. The first accommodating groove 614 is used to accommodate the rolling bearing 51b. The rolling bearing 51b is a radial bearing, but not limited thereto. The sleeve 61 is supported on the axle 2 through the rolling bearing 51b. As shown in FIG. 2, the position of the rolling bearing 51b in the extension direction D1 corresponds to the position of the side cover 5B. In other words, this rolling bearing 51b not only supports the sleeve 61 on the axle 2, but also indirectly supports the side cover 5B (or casing 5) on the axle 2.

As shown in FIGS. 3 and 4, in this embodiment, the arrangement part 615 of the sleeve 61 is, for example, a ring groove. The ring groove is located on the outer diameter surface of the third section 61C and concave in the radial direction D2 of the sleeve 61. The arrangement part 615 is suitable for accommodating the sensing unit 71 of the torque sensor 7 and electrically connected to the third substrate 72 of the sensing unit 71. As shown in FIG. 4, when the sleeve 61 is assembled with the outer cylinder 62, the outer cylinder 62 covers the arrangement part 615, and the distance between the outer diameter surface of the second section 61B and the axle 2 and the distance between the outer diameter surface of the fourth section 61D and the axle 2 both are greater than the distance between the outer diameter surface of the third section 61C and the axle 2. In other words, the sensing unit 71 can be surrounded by the sleeve 61 and the outer cylinder 62 and therefore is not easily affected by external environmental interference, thereby improving the measurement accuracy of the torque sensor 7.

As shown in FIGS. 3 and 4, in this embodiment, the sensing unit 71 is, for example, two rectangular strain gauges (only one strain gauge is drawn due to the perspective relationship). The strain gauges are connected to the surface of the arrangement part 615. When setting, the sensing direction of the strain gauge is configured to sense the change of the sleeve 61 along the circumferential direction D3. Along the circumferential direction D3 of the sleeve 61, the two strain gauges are arranged symmetrically to the axis A of the sleeve 61. As shown in FIG. 3, the two strain gauges are arranged obliquely at 135 degrees and 315 degrees relative to the gravity direction D4, but not limited thereto. The third substrate 72, for example, corresponds to the shape of the arrangement part 615 and presents a semi-circular shape. The two ends of the third substrate 72 along the circumferential direction D3 of the sleeve 61 are respectively connected to the two strain gauges (represented by sensing units 71). The detailed shape of the third substrate 72 can be changed according to requirements. As shown in FIG. 4, there is an interval d between the sensing unit 71 and the axis A of the axle 2. The interval d is between 8.15 mm and 12.6 mm, but not limited thereto.

As shown in FIG. 4, the sleeve 61 forms a second accommodating groove 616 on the inner diameter surface of the third section 61C. The second accommodating groove 616 is communicated with the cavity S2 through the interior of the sleeve 61. The second accommodating groove 616 is suitable for accommodating the fourth substrate 73 electrically connected to the third substrate 72. Specifically, the sleeve 61 is provided with a channel (not shown in the figure) in the radial direction D2 communicated with the arrangement part 615 and the second accommodating groove 616 on the third section 61C. Therefore, the third substrate 72 of the torque sensor 7 can be connected to the fourth substrate 73 in the second accommodating groove 616 through the channel. In other words, the size of the substrate of the torque sensor 7 (in this embodiment, the sum of the third substrate 72 and the fourth substrate 73) is increased. In addition, in this embodiment, the sleeve 61 further has a sleeve ring 616b. The sleeve ring 616b is suitable for covering the opening 616a on the side of the second accommodating groove 616 near the axle 2. The inner diameter of the sleeve ring 616b corresponds to the inner diameter of the fourth section 61D and the inner diameter of the fifth section 61E. The sleeve ring 616b is used to protect the fourth substrate 73.

Figure 5:
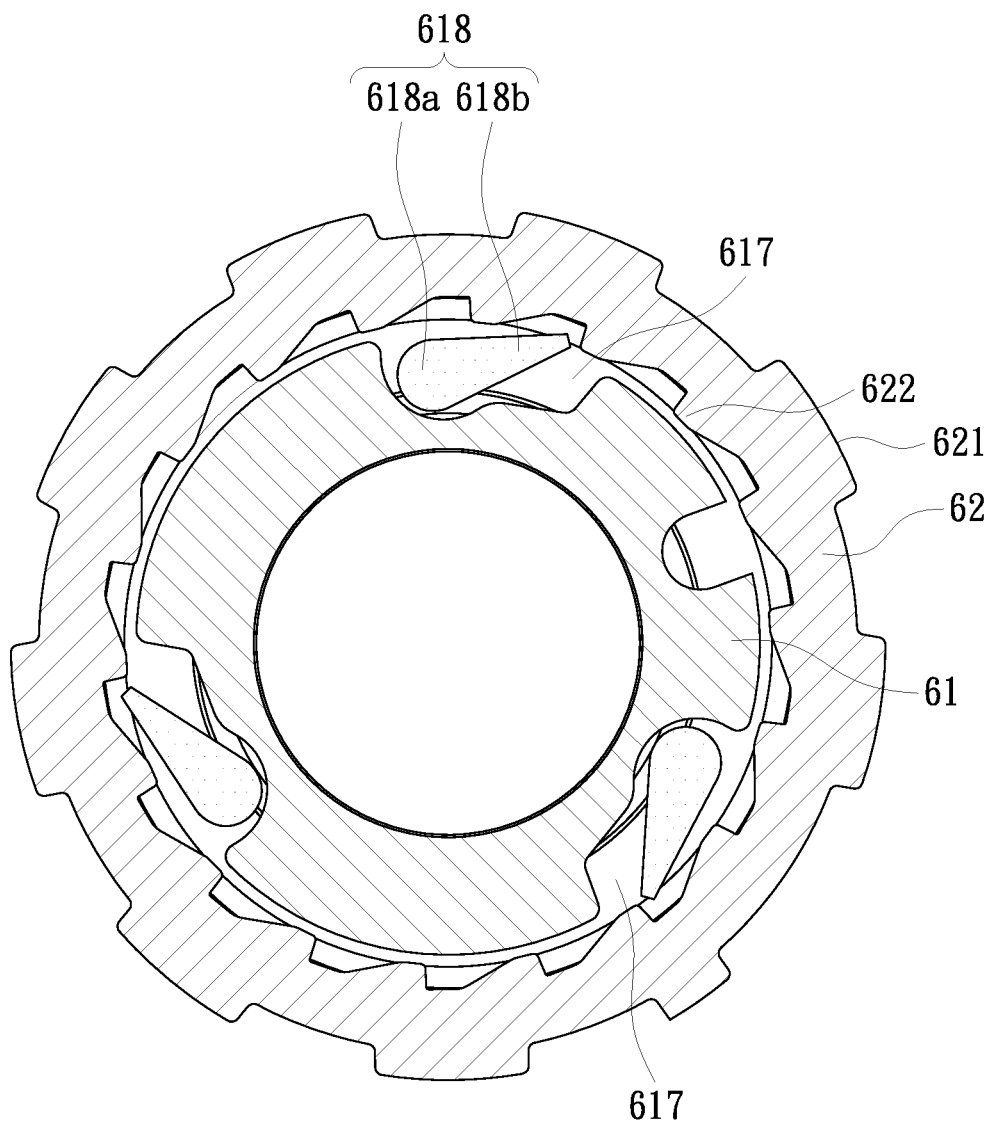
FIG. 5 is a schematic cross-sectional diagram of the internal ratchet mechanism of the sleeve in FIG. 2.

FIG. 5 is a schematic cross-sectional diagram of the internal ratchet mechanism of the sleeve in FIG. 2. As shown in FIGS. 3 and 5, the fourth section 61D of the sleeve 61 has, for example, three third accommodating grooves 617 surrounding the outer diameter surface of the sleeve 61 in the radial direction D2. Each third accommodating groove 617 is used to accommodate a paddle 618. The paddle 618 has a positioning end 618a and a pushing end 618b. The positioning end 618a can swing and be arranged in the third accommodating groove 617. The pushing end 618b protrudes out of the third accommodating groove 617 in the radial direction D2 of the sleeve 61 by the action of an elastic component (not shown in the figure) and can contact the internal ratchet 622 on the inner diameter surface of the outer cylinder 62. The fourth section 61D of the sleeve 61 is further provided with a groove 617a that extends along the circumferential direction D3 of the sleeve 61 and passes through the third accommodating groove 617, but the detailed structure of the components of the fourth section 61D is not limited thereto.

The sleeve 61, the paddle 618, and the outer cylinder 62 are assembled to form the internal ratchet mechanism. Through the action between the paddle 618 and the internal ratchet 622 on the outer cylinder 62, the outer cylinder 62 and the sleeve 61 can relatively rotate along the circumferential direction D3 of the axle 2. For example, the outer cylinder 62 and the sleeve 61 can relatively rotate along the circumferential direction D3 (clockwise direction) of the axle 2, but the outer cylinder 62 and the sleeve 61 cannot relatively rotate along the circumferential direction D3 (counterclockwise direction) of the axle 2. Therefore, the bicycle users can drive the sleeve 61 to rotate in one direction by stepping on the bicycle pedal (not shown in the figure) and through the chain (not shown in the figure), thereby driving the casing 5 of the hub motor 1 to rotate. When the stator 3 in the hub motor 1 is powered and causes the rotation speed of the casing 5 to exceed the speed at which the user drives the casing 5 to rotate, the sleeve 61 can rotate independently the outer cylinder 62 and the sleeve 61 through the action of the internal ratchet 622 and the paddle 618.

From the above, it can be known that the third section 61C equipped with the sensing unit 71 is located between the second section 61B connected to the casing 5 and the fourth section 61D connected to the outer cylinder 62. Therefore, when the two ends of the sleeve 61 in the extension direction D1 are respectively affected by external forces from the second section 61B and the fourth section 61D, the sensing unit 71 (strain gauge) can change its shape along the circumferential direction D3 to sense the torque input by the user.

As shown in FIGS. 2 to 4, the sleeve 61 is provided with a fourth accommodating groove 619 on the outer diameter surface of the fifth section 61E. The opening direction of the fourth accommodating groove 619 faces the outer cylinder 62, and the fourth accommodating groove 619 is suitable for accommodating the rolling bearing 51c. When assembled, this rolling bearing 51c contacts the inner wall surface of the outer cylinder 62, in other words, the sleeve 61 indirectly supports the outer cylinder 62 through the fifth section 61E.

As shown in FIG. 4, in this embodiment, in addition to being supported by the rolling bearing 51c on the sleeve 61 as mentioned in the previous paragraph, the outer cylinder 62 is also supported by the rolling bearing 51d installed between the outer cylinder 62 and the axle 2 (detailed later). The rolling bearing 51c and the rolling bearing 51d are radial bearings, but are not limited thereto.

As shown in FIGS. 2 and 4, with the above settings, in this embodiment, the sensing unit 71 is attached to the outer diameter surface of the sleeve 61 and covered by the outer cylinder 62. Therefore, compared to arranging the sensing unit 71 in the second accommodating groove 616, the sensing unit 71 in this embodiment has a far radius distance from the rotation axis of the axle 2 (see the interval d in FIG. 4 for details), resulting in higher sensing accuracy. In addition, the surrounding of the sensing unit 71 is protected by the walls of the outer cylinder 62 and the sleeve 61, which can avoid environmental impact. More specifically, if small dust runs into the gap between the axle 2 and the sleeve 61 during operation, the sensing unit 71 is located on the outer diameter surface of the sleeve 61, and therefore the sensing unit 71 is protected by the wall surface of the sleeve 61 and can prevent dust from affecting the sensing unit 71. In addition, as shown in FIG. 4, because the rolling bearing 51c and the rolling bearing 51d cover the gap between the outer diameter surface of the sleeve 61 and the inner diameter surface of the outer cylinder 62 in the extension direction D1, it can also prevent dust from entering from the gap and affecting the sensing unit 71.

Based on the above description, the hub motor of the present disclosure has good sensing performance by installing the sensing unit of the torque sensor on the surface of the sleeve far from the axle, which can block, by sleeve, water or dirt entering the gap between the axle and the sleeve and therefore preventing the sensing unit of the torque sensor from being affected.

What is claimed is:

1. A hub motor, suitable to be mounted on a bicycle, the hub motor comprising:
    an axle, fixed to a frame of the bicycle and having a first end and a second end opposite to the first end;
    a stator, fixed to the axle and near the first end, wherein the stator comprises an electromagnet;
    a rotor, rotatably sleeved on the axle and suitable for rotating around the stator;
    a casing, rotatably sleeved on the axle and suitable for rotating around the rotor and the axle, wherein the casing forms an accommodating space, a first perforation, an opening, and a side cover, the side cover is used to close the opening and is provided with a second perforation, the accommodating space accommodates the stator and the rotor, the opening faces the second end, and the axle is arranged to pass through the casing and the side cover respectively through the first perforation and the second perforation;
    a sleeve, sleeved at the second end of the axle and connected to the side cover, wherein the sleeve has an arrangement part, and the arrangement part is located on a surface of a side of the sleeve away from the axle;
    a torque sensor, connected to the sleeve and comprising a sensing unit, wherein the sensing unit is arranged in the arrangement part; and
    an outer cylinder, sleeved on the sleeve and covering the arrangement part and the torque sensor.

2. The hub motor according to claim 1, wherein the sensing unit has an interval to an axis of the axle, and the interval is between 8.15 mm and 12.6 mm.

3. The hub motor according to claim 1, wherein the sleeve and the outer cylinder jointly form an internal ratchet mechanism.

4. The hub motor according to claim 3, wherein the outer cylinder is suitable for engaging a variable speed gear set of the bicycle.

5. The hub motor according to claim 1, wherein the sensing unit is a strain gauge, and a sensing direction of the strain gauge is set along a circumferential direction of the sleeve.

6. The hub motor according to claim 1, further comprising a power supply, a first coil, and a second coil, wherein the power supply is electrically connected to the torque sensor, the first coil is electrically connected to a power supply and fixed on the axle, the second coil is fixed on the sleeve and parallel to the first coil and is suitable for rotation relative to the first coil, and the torque sensor is electrically connected to the second coil and electrically connected to the power supply through the first coil and the second coil.

* * * * *